Patented Dec. 26, 1922.

1,440,234

UNITED STATES PATENT OFFICE.

CLARENCE LUPFER NORTH, OF EL PASO, TEXAS.

MANUFACTURE OF BRICKS.

No Drawing.   Application filed June 26, 1922.   Serial No. 571,043.

*To all whom it may concern:*

Be it known that I, CLARENCE LUPFER NORTH, a citizen of the United States, residing at El Paso, county of El Paso and State of Texas, have invented certain new and useful Improvements in the Manufacture of Bricks; and I do hereby declare the following to be a full, clear, and exact description of the invention, such as will enable others skilled in the art to which it appertains to make and use the same.

This invention relates to improvements in the manufacture of brick, and it involves the use of the solid waste products from coal burning furnaces in connection with other cheap ingredients in the manufacture of a light and highly efficient brick.

According to my invention I use the refuse from the ashpits of coal burning furnaces comprising clinker ash, more or less slate and other material, and this is ground to pass through a $\frac{1}{8}''$ to $\frac{1}{4}''$ mesh screen, and into this mixture more or less hydrated lime is incorporated and water added, and the resultant product is then compressed into the desired shape brick, or other preferred shape in a dry brick mold, and the molded product is then conveyed by means of suitable cars into a retort which is subsequently closed and filled with superheated steam under high pressure.

The action of the steam on the brick completes the hydration of the lime under high temperature, and causes formation of a cementitious brick which may be taken out of the retort and used when sufficiently cooled.

In carrying out the manufacture aforesaid, I preferably use 87% of cinders and 13% of the dry hydrated lime which are ground together, and water is added to make the mass sufficiently plastic to be properly molded, and then the product is molded in a suitable brick press and subjected to the steam treatment as hereinbefore described.

I have found in practice that there are two convenient modes of preparing the brick which may be stated briefly as follows:—

(1) The cinders and hydrated lime are ground together in any suitable grinding machine so they can be passed through a $\frac{1}{8}''$ to $\frac{1}{4}''$ mesh screen, when they are thoroughly mixed sufficient water is added to make the mass plastic, and the plastic mass is then shaped in the molds and is finally subjected in curing retorts to steam under high pressure for a period of from 4 to 8 hours.

(2) Another method which I have found satisfactory is to mix wet ground cinders with quick lime and pass the two through a pair of rolls or grinding machine and discharge the product into a tank, like a silo, and then let the product go through a sweat of from 10 to 24 hours, or for a sufficient time to thoroughly hydrate the lime. This subjecting of the product to the sweating operation just referred to is highly economical and efficient, because the mass will rise to a high temperature, steam will be generated from the wet cinders and the lime in the mixture will be thoroughly hydrated, and the expense of separately hydrating the lime and then mixing it with the cinders will be avoided.

After the product has undergone the sweating operation referred to, it can be immediately conveyed to the brick press and pressed into suitable shapes and then continued on to the curing cylinders for the steam treatment as aforesaid.

In the steam treatment referred to in either process just described, the temperature of the steam should preferably be high enough to ensure the best results, for instance about 280 to 340° F. The final product will be a brick with a rough finish which is especially adapted to taking cement plaster for a stucco. The brick is also especially adapted for filling purposes where a smooth outer face is not required and where the texture of the rough outer surface of the brick enables it to form a specially strong joint with the mortar or cement used in a building construction.

The special advantage of the brick is that it is very much lighter than ordinary clay brick, being from 20 to 25% lighter than the ordinary clay brick. This lightness is of special advantage in handling the bricks, either in loading the same or in transporting, and more especially saves a large part of the work of the hod carriers.

The brick as herein described would ordinarily be a dull lead color, but it can be made red or almost any other desired color by adding suitable coloring matter to the mass before the final mixture of the cinders and the hydrated lime has been completed.

A special advantage of the brick manufactured as herein described is that it absorbs water very slowly in a small degree, and is hence especially suitable for use in wet or humid climates.

Moreover, this property renders it less apt to break up or scale off or otherwise disintegrate by having absorbed water in cold weather, and this water freezing before the brick becomes dry again.

While I have specially referred to the product as brick, I mean such term to cover hollow or other tiles for building purposes, such as for use in constructing walls, partitions between rooms, or floors, roofing, or the like.

It will be obvious that the proportions of the ingredients may be varied to suit varying conditions, and also the length of time of the various steps in the treatment and the temperature of the steam used, and I do not mean to limit the invention to such details except as particularly pointed out in the claims.

Having thus described my invention what I claim and desire to secure by Letters Patent of the United States is:—

1. The method of manufacturing brick which consists in grinding the entire solid residue from the ashpit of a coal furnace into a finely divided condition, incorporating with this mass hydrated lime, adding water to make the mass plastic, molding the wet mass in brick molds, and finally subjecting the product to the action of steam under pressure in a closed retort.

2. The method of manufacturing brick which consists in grinding the entire solid residue from the ashpit of a coal furnace into a finely divided condition, then incorporating with this mass hydrated lime, then adding water to make the mass plastic, then molding the wet mass in brick molds, and finally subjecting the product to the action of superheated steam under pressure in a closed retort.

3. The method of manufacturing brick which consists in grinding the entire solid residue from the ashpit of a coal furnace into a finely divided condition, incorporating with about 87% by weight of this mass about 13% by weight of hydrated lime, adding water to make the mass plastic, molding the wet mass in brick molds, and finally subjecting the product to the action of steam under pressure in a closed retort.

4. The method of manufacturing brick which consists in grinding the entire solid residue from the ashpit of a coal furnace into a finely divided condition, intimately mixing with this mass unslaked lime, then adding water to the mass and allowing the mixture to stand in a closed vessel, then molding the mass in brick molds, and finally subjecting the product to the action of steam under pressure in a closed retort.

5. The method of manufacturing brick which consists in grinding the entire solid residue from the ashpit of a coal furnace into a finely divided condition, intimately mixing with about 87% of this mass about 13% of unslaked lime, then adding water to the mass and allowing the mixture to stand in a closed vessel, then molding the mass in brick molds, and finally subjecting the product to the action of steam under pressure in a closed retort.

CLARENCE LUPFER NORTH.